(12) United States Patent
Schmidt

(10) Patent No.: US 7,187,663 B2
(45) Date of Patent: Mar. 6, 2007

(54) FLEXIBLE PROCESSING SYSTEM

(76) Inventor: Dominik J. Schmidt, 580 Arastradero Rd., Palo Alto, CA (US) 94306

( * ) Notice: Subject to any disclaimer, the term of this patent is extended or adjusted under 35 U.S.C. 154(b) by 892 days.

(21) Appl. No.: 09/973,579

(22) Filed: Oct. 9, 2001

(65) Prior Publication Data

US 2003/0067894 A1    Apr. 10, 2003

(51) Int. Cl.
*H04Q 7/00*    (2006.01)
(52) U.S. Cl. .................... 370/313; 370/328
(58) Field of Classification Search .......... 370/277, 370/278, 280, 281, 311, 318, 319, 328, 465, 370/466, 467, 469
See application file for complete search history.

(56) References Cited

U.S. PATENT DOCUMENTS

| | | | |
|---|---|---|---|
| 4,653,068 A | 3/1987 | Kadin | |
| 5,384,826 A | 1/1995 | Amitay | |
| 5,619,399 A | 4/1997 | Mok | 361/707 |
| 5,640,399 A | 6/1997 | Rostoker et al. | |
| 5,649,001 A | 7/1997 | Thomas et al. | |
| 5,784,636 A | 7/1998 | Rupp | 712/37 |
| 5,923,702 A | 7/1999 | Brenner et al. | |
| 5,949,775 A | 9/1999 | Rautiola et al. | |
| 5,974,463 A | 10/1999 | Warrier et al. | |
| 6,096,091 A * | 8/2000 | Hartmann | 716/17 |
| 6,119,179 A | 9/2000 | Palermo | |
| 6,317,819 B1 | 11/2001 | Morton | 712/22 |
| 6,366,622 B1 | 4/2002 | Brown et al. | 375/322 |
| 6,400,928 B1 | 6/2002 | Kullar et al. | 455/67.11 |
| 6,405,027 B1 | 6/2002 | Bell | 455/403 |
| 6,441,442 B1 | 8/2002 | Wong | 257/371 |
| 6,603,915 B2 | 8/2003 | Glebov et al. | 385/129 |
| 6,631,259 B2 | 10/2003 | Pecen et al. | 370/314 |
| 6,763,444 B2 | 7/2004 | Thomann et al. | 711/170 |
| 7,031,668 B2 | 4/2006 | Darabi et al. | 455/75 |
| 2001/0034227 A1 | 10/2001 | Subramanian et al. | 455/419 |
| 2002/0015401 A1 | 2/2002 | Subramanian et al. | 370/347 |
| 2002/0031166 A1* | 3/2002 | Subramanian et al. | 375/130 |
| 2002/0059434 A1 | 5/2002 | Karaoguz et al. | 709/228 |
| 2002/0128037 A1 | 9/2002 | Schmidt | 455/553.1 |
| 2002/0197998 A1* | 12/2002 | Schmidt | 455/452 |
| 2003/0035388 A1* | 2/2003 | Schmidt | 370/329 |
| 2003/0058830 A1* | 3/2003 | Schmidt | 370/347 |
| 2004/0243866 A1* | 12/2004 | Sherburne, Jr. | 713/320 |

OTHER PUBLICATIONS

Kneip et al. "Single Chip Programmable Baseband ASSP for 5 GHz Wireless LAN Applications." IEICE Trans. Electron., vol. E85-C, No. 2. Feb. 2002. pp. 359-367.

* cited by examiner

*Primary Examiner*—Chi Pham
*Assistant Examiner*—Anh-Vu Ly

(57) ABSTRACT

A multi-mode wireless device on a single substrate includes an analog portion and a digital portion integrated on the single substrate. The analog portion includes a cellular radio core; and a short-range wireless transceiver core. The digital portion includes a multi-processor core with a master processor coupled to a router which distributes data from the radio chip to a serial-parallel array of DSP processors, each of which is connected to multiple DSP coprocessors. This arrangement allows for decoding both complex protocols at low data rates (like GPRS), simple protocols at high data rates (like 802.11A) and complex protocols at high data rates (like WCDMA), using the same hardware.

7 Claims, 3 Drawing Sheets

FLEXIBLE PROCESSING SYSTEM

BACKGROUND

The present invention relates to a flexible processing system.

Advances in computer technology have provided high performance, miniaturized computers that are inexpensive. Even with these impressive achievements, manufacturers are constantly looking for improvements in areas such as user-friendliness and connectivity so that users can be productive any time anywhere. Wireless communications networks offer the user such capabilities. However, the speed and computational robustness of present-day wireless communications systems leave much to be desired.

In response, the industry is adopting new technologies such as 802.11A, GPRS and EDGE wireless networking technologies tat drive transparent connections between all computing, communications, audio and video devices. 802.11A transceivers communicate at the 5 GHz frequency and offer 100 Mbps throughput, in contrast to the 2.4 GHz frequency and the 11 Mbps throughput of 802.11B transceivers.

General Packet Radio Service (GPRS) brings packet data connectivity to the Global System for Mobile Communications (GSM) market. GPRS integrates GSM and Internet Protocol (IP) technologies and is a bearer for different types of wireless data applications wit bursty data, especially WAP-based information retrieval and database access. GPRS packet-switched data technology makes efficient use of radio and network resources. Session set-up is nearly instantaneous, while higher bit rates enable convenient personal and business applications. Consequently, GPRS not only makes wireless applications more usable, but also opens up a variety of new applications in personal messaging and wireless corporate intranet access.

EDGE stands for Enhanced Data rates for Global Evolution EDGE is the result of a joint effort between TDMA operators, vendors and carriers and the GSM Alliance to develop a common set of third generation wireless standards that support high-speed modulation. EDGE is a major component in the UWC-136 standard that TDMA carriers have proposed as their third-generation standard of choice. Using existing infrastructure, EDGE technology enables data transmission speeds of up to 384 kilobits per second.

The new standards such as 802.11A, EDGE and GPRS achieve increased transmission throughput by using complex digital signal processing algorithms, many of which require high processing power exceeding that offered by today's baseband processors.

One way to increase processing power is to perform computations in parallel using hardwired, dedicated processors that are optimized for one particular radio frequency (RF) protocol. Although highly effective when geared to handle one RF protocol, this approach is relatively inflexible and cannot be easily, switched to handle today's multi-mode cellular telephones that need to communicate with a plurality of RF protocols.

Another way to increase processing power is to perform computations in parallel using general-purpose processors. Although flexible in programmability, such an approach may not provide the highest possible computational power that may be needed when performing digital signal processing for specific wireless applications such as 802.11A or GPRS applications.

Yet another approach uses reconfigurable logic computer architectures are computing systems that include an array of programmable logic and programmable interconnect elements. The elements can be configured and reconfigured by the end user to implement a wide range of logic functions and digital circuits and to implement custom algorithm-specific circuits that accelerate the execution of the algorithm. High levels of performance are achieved because the gate-level customizations made possible with FPGAs results in an extremely efficient circuit organization that uses customized data-paths and "hardwired" control structures. These circuits exhibit significant fine-grained, gate-level parallelism that is not achievable with programmable, instruction-based technologies such as microprocessors or supercomputers. This makes such architectures especially well suited to applications requiring the execution of multiple computations during the processing of a large amount of data. A basic reconfigurable system consists of two elements: a reconfigurable circuit resource of sufficient size and complexity, and a library of circuit descriptions (configurations) that can be down-loaded into the resource to configure it. The reconfigurable resource would consist of a uniform array of orthogonal logic elements (general-purpose elements with no fixed functionality) that would be capable of being configured to implement any desired digital function. The configuration library would contain the basic logic and interconnect primitives that could be used to create larger and more complex circuit descriptions. The circuit descriptions in the library could also include more complex structures such as counters, multiplexers, small memories, and even structures such as controllers, large memories and microcontroller core. For example, U.S. Pat. No. 5,784,636 to Rupp on Jul. 21, 1998 discusses a reconfigurable processor architecture using a programmable logic structure called an Adaptive Logic Processor (ALP). The Rupp structure is similar to an extendible field programmable gate array (FPGA) and is optimized for the implementation of program specific pipeline functions, where the function may be changed any number of times during the progress of a computation. A Reconfigurable Pipeline Instruction Control (RPIC) unit is used for loading the pipeline functions into the ALP during the configuration process and coordinating the operations of the ALP with other information processing structures, such as memory, I/O devices, and arithmetic processing units. Multiple components having the Rupp reconfigurable architecture may be combined to produce high performance parallel processing systems based on the Single Instruction Multiple Data (SIMD) architecture concept.

SUMMARY

A multi-mode wireless device on a single substrate includes an analog portion and a digital portion integrated on the single substrate. The analog portion includes a cellular radio core; and a short-range wireless transceiver core. The digital portion includes a multi-processor core with a master processor coupled to a router which distributes data from the radio chip to a serial-parallel array of DSP processors, each of which is connected to multiple DSP coprocessors. This arrangement allows for decoding both complex protocols at low data rates (like GPRS), simple protocols at high data rates (like 802.11A) and complex protocols at high data rates (like WCDMA), using the same hardware.

Advantages of the system may include one or more of the following. A high performance, low overhead system for wireless communication system expanding the functionality and capabilities of a computer system is provided. The system effectively combines multiple components required to implement cellular radio, 802 11A and/or Bluetooth.™. into a single integrated circuit device. The complete integration of components greatly reduces manufacturing costs. Another benefit is the fact that a single chip solution results in much lower communication overhead, in comparison to prior art multiple chip card system. The system provides for fast, easy migration of existing designs to high performance, high efficiency single chip solutions. Many elements of the LAN and WAN architecture are the same and can be re-used. For example, the Gaussian filter is used both in GSM communication and in Bluetooth communication. Similarly, the MLSE decoder and convolutional decoder are present in almost every wireless protocol, so they can be used without resource duplication. The system provides a combination of software/DSP/ASIC resources that are globally and transparently 'alterable' and that can be scaled to provide vast processing power to handle the requirements of RF digital signal processing.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
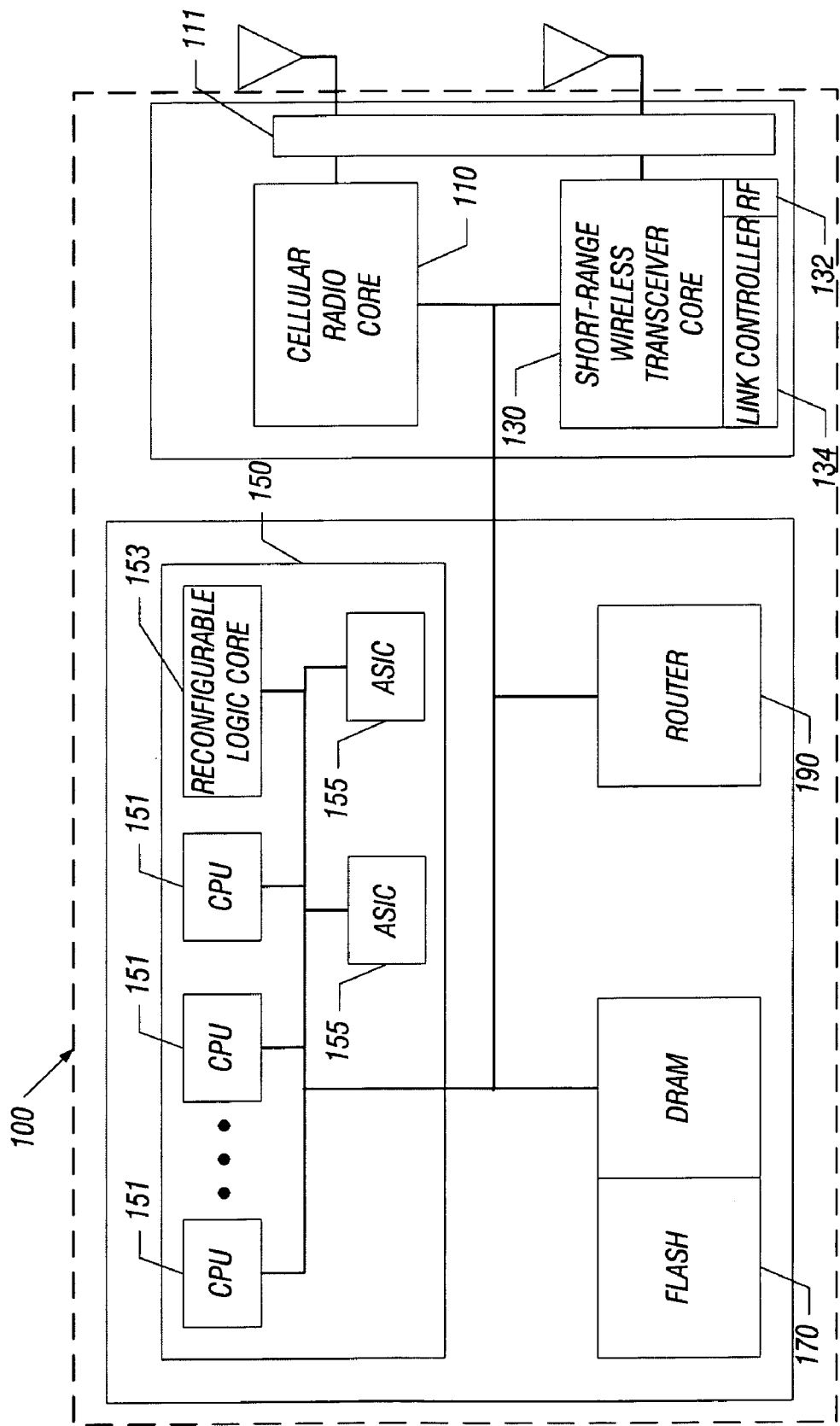
FIG. 1A is a block diagram of a single chip wireless communications integrated circuit.

FIG. 1A shows a block diagram of a multi-mode wireless communicator device 100 fabricated on a single silicon integrated chip. In one implementation, the device 100 is an integrated CMOS device with radio frequency (RF) circuits, including a cellular radio core 110, a short-range wireless transceiver core 130, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core.

The reconfigurable processor core 150 can include one or more general-purpose processors 151 such as RISC processors and these processors can support digital signal processing (DSP) capability through dual multiply-accumulate (MAC) circuits, for example. The processor core 150 includes a reconfigurable logic core 153. The reconfigurable logic core 153 can be a 'flexible' application specific integrated circuit (ASIC) block in front and possibly in between the processors 151. The reconfigurable logic core 153 can, but normally does not fetch data/instructions from memory. Rather, the reconfigurable logic core 153 gets data directly from the A/D converters to perform the initial computations.

In one implementation, the reconfigurable logic core 153 is programmed as a hardcoded vector processor in front of the general purpose processor cores 151, to do the bulk of the processing and to 'parallelize' the data output. This parallel data output would then be fed simultaneously to all general purpose processor cores 151 (rater tan in series) for additional DSP operation. The reconfigurable logic core 153 pre-packages the data so that the processor cores 151 working in parallel can efficiently process the RF data stream. The general-purpose processor cores 151, upon detecting that a high-speed standard is being used, select this parallel mode. The processor cores 151 also selects the ASIC preprocessor function of the reconfigurable logic core 153, which tough hardcoded can still be customized on the fly by selecting one or more architecture selection switches. In one embodiment, a router 190 is used to de-correlate the incoming data such as data from 802.11 or GPRS transmitters and send the de-correlated data to the processor cores 151. Typically, data coming is 'related', so a block of, for example, 200 bits is needed to reconstruct the original signal. The router takes this data-word and converts the stream into parallel streams that are not time-correlated so that the processors can operate in parallel.

In another implementation, a 'pipeline' architecture is achieved by linking the processors 151–153 in series and performing differing operations on each (this is more suitable for processing GPRS data) and then switching to a parallel implementation for high-speed standards. The general-purpose cores 151 have a granular control over clock speeds, which can be multiples of the master clock to achieve synchronous operation to allow precise control over the processors.

Additionally, dedicated hardware 155 can be provided to handle specific algorithms in silicon more efficiently than the processing cores 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

One exemplary processor embedded in the multi-processor core 150 includes a register bank, a multiplier, a barrel shifter, an arithmetic logic unit (ALU) and a write data register. The exemplary processor can handle DSP functions by having a multiply-accumulate (MAC) unit in parallel with the ALU. Embodiments of the processor can rapidly execute multiply-accumulate (MAC) and add-compare-subtract (ACS) In another embodiment, a DSP co-processor can be provided to supplement the RISC processor cores. In these embodiments, the processor can execute instructions in either scalar or vector mode. Other parts of the exemplary processor include an instruction pipeline, a multiplexer, one or more instruction decoders, and a read data register. A program counter (PC) register addresses the memory system 170. A program counter controller serves to increment the program counter value within the program counter register as each instruction is executed and a new instruction must be fetched for the instruction pipeline. Also, when a branch instruction is executed, the target address of the branch instruction is loaded into the program counter by the program counter controller. The processor core 150 incorporates data pathways between the various functional units The lines of the data pathways may be synchronously used for writing information into the core 150, or for reading information from the core 150. Strobe lines can be used for this purpose.

In operation, instructions within the instruction pipeline are decoded by one or more of the instruction decoders to produce various core control signals that are passed to the different functional elements of the processor core 150. In response to these core control signals, the different portions of the processor core conduct processing operations, such as multiplication, addition, subtraction and logical operations. The register bank includes a current programming status register (CPSR) and a saved programming status register (SPSR). The current programming status register holds various condition and status flags for the processor core 150. These flags may include processing mode flags (e.g. system mode, user mode, memory abort mode, etc.) as well as flags indicating the occurrence of zero results in arithmetic operations, carries and the like.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth.™. connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver core 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell radio core 110 provides wide area network (WAN) access, while the short-range wireless transceiver core 130 supports local area network (LAN) access. The reconfigurable processor core 150 has embedded read-only-memory (ROM) containing software such as IEEE802 11, GSM, GPRS, Edge, and/or Bluetooth™ protocol software, among others.

In one embodiment, the cellular radio core 110 includes a transmitter/receiver section that is connected to an off-chip antenna. The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of the transmitter/receiver section, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I, I, Q, Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF-unit 132 includes an RF receiver connected to an analog-digital converter (ADC), which in turn is connected to a modem 116 performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth.™. specification and processes Bluetooth.™. packet types. For header creation, the link controller core 134 performs a header error check, scrambles the header to randomize the data and to minmize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office and browses a web site on a portable computer through a wired local area network cable such as an Ethernet cable. Then the user walks to a nearby cubicle. As the user disconnects, the device 100 initiates a short-range connection using a Bluetooth™ connection. When the user drives from his or her office to an off-site meeting, the Bluetooth™ connection is replaced with cellular telephone connection. Thus, the device 100 enables easy synchronization and mobility during a cordless connection, and open up possibilities for establishing quick, temporary (ad-hoc) connections with colleagues, friends, or office networks. Appliances using the device 100 are easy to use since they can be set to automatically find and contact each other when within range.

When the multi-mode wireless communicator device 100 is in the cellular telephone connection mode, the short-range wireless transceiver core 130 is powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver core 130 to search for a Bluetooth™ channel signal. If Bluetooth™ signals are detected, the phone sends a deregistration message to the cellular system and/or a registration message to the Bluetooth™ system. Upon deregistration from the cellular system, the cellular radio core 110 is turned off or put into a deep sleep mode with periodic pinging and the short-range wireless transceiver core 130 and relevant parts of the synthesizer are powered up to listen to the Bluetooth™ channel.

According to one implementation, when the short-range wireless core 130 in the idle mode detects that Bluetooth™ signals have dropped in strength, the device 100 activates the cellular radio core 110 to establish a cellular link, using information from the latest periodic ping. If a cellular connection is established and Bluetooth™ signals are weak, the device 100 sends a deregistration message to the Bluetooth™ system and/or a registration message to the cellular system. Upon registration from the cellular system, the short-range transceiver core 130 is turned off or put into a deep sleep mode and the cellular radio core 110 and relevant parts of the synthesizer are powered up to listen to the cellular channel.

The router 190 can send packets in parallel through the separate pathways of cellular or Bluetooth.™. For example, if a Bluetooth.™. connection is established, the router 190 knows which address it is looking at and will be able to immediately route packets using another connection standard. In doing this operation, the router 190 pings its environment to decide on optimal transmission medium. If the signal reception is poor for both pathways, the router 190 can send some packets in parallel through both the primary and secondary communication channel (cellular and/or Bluetooth.™.) to make sure some of the packets arrive at their destinations. However, if the signal strength is adequate, the router 190 prefers the Bluetooth.™. mode to minimize the number of subscribers using the capacity-limited and more expensive cellular system at any give time. Only a small percentage of the device 100, those that are temporarily outside the Bluetooth coverage, represents a potential load on the capacity of the cellular system, so that the number of mobile users can be many times greater than the capacity of the cellular system alone could support.

Figure 1B:
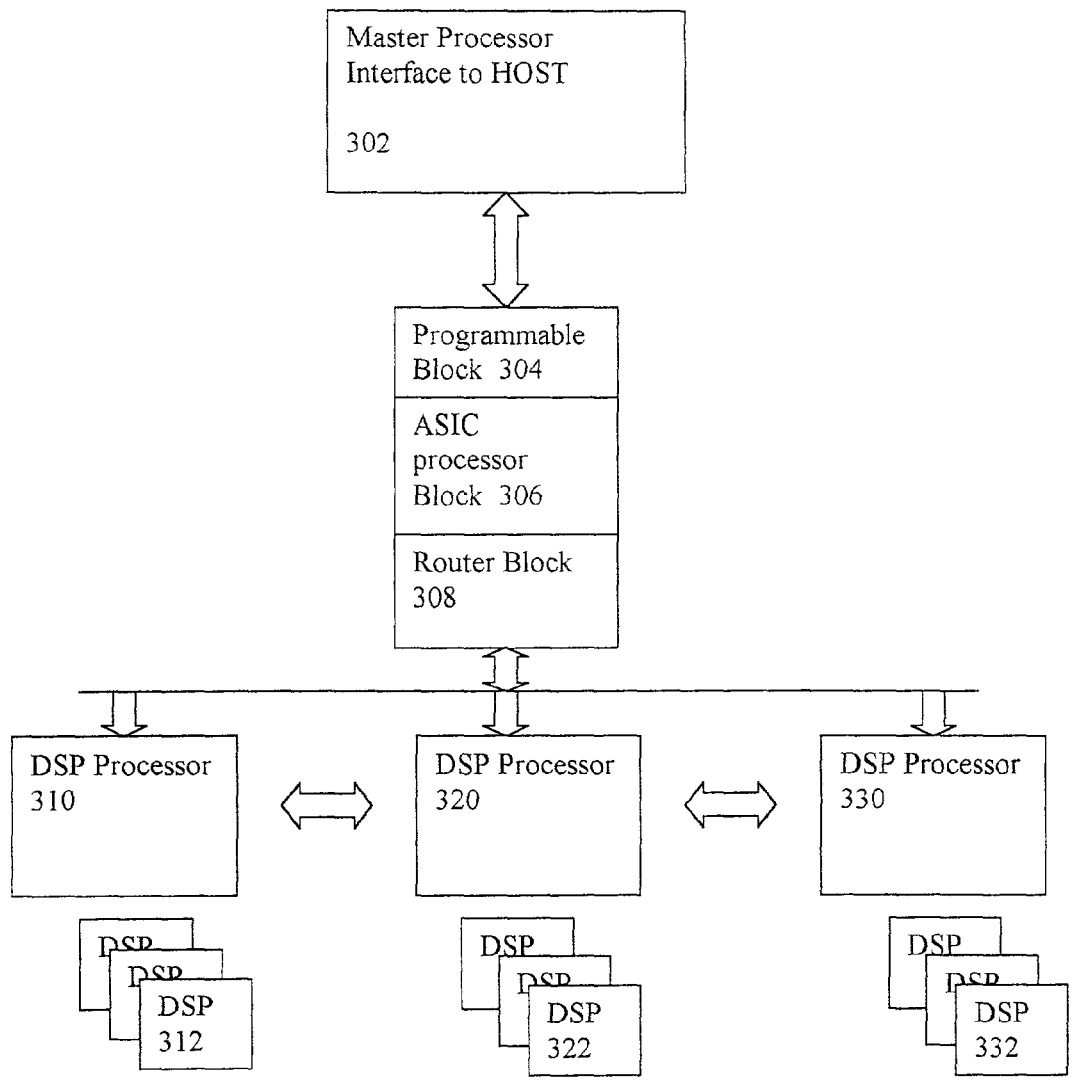
FIG. 1B is a block diagram of an exemplary multi-processor system.

FIG. 1B is a block diagram of an exemplary multi-processor system. A master processor 302 interfaces to a host system that can include RF circuitry. The master processor 302 in turn communicates with a programmable block 304, an application specific processor block 306 and a router block 308. The router block 308 communicates with one or more processing units, each including a processor and one or more digital signal processors (DSPs). In the embodiment of FIG. 1B, processor 310 communicates with one or more DSPs 312, processor 320 communicates with one or more DSPs 322, and processor 330 communicates with one or more DSPs 332. As discussed above, the router block 308 is used to de-correlate the incoming data such as data from 802.11 or GPRS transmitters and send the de-correlated data to the processors 310, 320 and 330. Typically, data coming is 'related' so a block of data is needed to reconstruct the original signal. The router block 308 takes this data-word and converts the stream into parallel streams that are not time-correlated so that the processors can operate in parallel.

Each DSP processor is a simple, small RISC processor that controls the DSP functions in a high level language such as C. The master processor 302 is a RISC processor which does all the flow control. The DSP subunits 312, 322 and 332 are small coprocessors that perform mathematical functions such as multiply-accumulate and add-compare-select.

Figure 2:
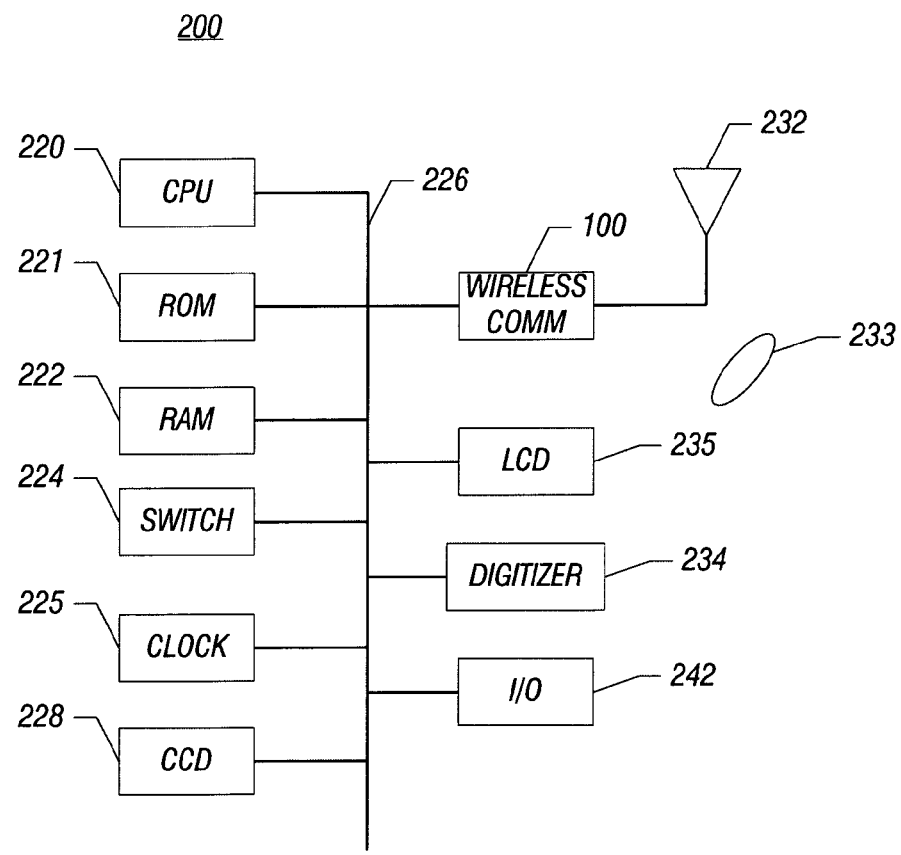
FIG. 2 is a block diagram of a portable computer system for providing data management support in accordance with the present invention.

The system of FIG. 2 supports 4 dimensional computing capability. In Dimension 1, each processor is doing a specific separate task. For example, one processor processes Bluetooth signal while another processor handles CPS processing In Dimension 2, each processor is doing tasks in series with the other processors. For example, one processor performs GPRS equalization, moves the data to the next processor which does convolutional decoding, moving the data to the next processor which does vocoder decoding. This way slow, complicated functions like GPRS can be performed.

In Dimension 3, data is received as a continuous stream from the radio (typically two 8 bit lines—digital I and digital Q data). This data is parallelized into slower streams and fed into the multiple processors. This is the function of the programmable router. The router takes data bits from the I/Q signals and sends them at a slower rate to the three processors. Since the serial data contains dependencies to neighboring data bits, the router separates the data stream into independent packets, and performs other high-speed operations well suited to a serial architecture (such as a Fast Fourier Transform). The data is then fed to the DSP processors. In Dimension 4, each DSP processor can further parallelize the data using multiple DSP coprocessors.

FIG. 2 illustrates an exemplary computer system 200 with the wireless communication device 100. The computer system 200 is preferably housed in a small, rectangular portable enclosure. Referring now to FIG. 2, a general purpose architecture for entering information into the data management by writing or speaking to the computer system is illustrated A processor 220 or central processing unit (CPU) provides the processing capability. The processor 220 can be a reduced instruction set computer (RISC) processor or a complex instruction set computer (CISC) processor. In one embodiment, the processor 220 is a low power CPU such as the MC68328V DragonBall device available from Motorola Inc.

The processor 220 is connected to a read-only-memory (ROM) 221 for receiving executable instructions as well as certain predefined data and variables. The processor 220 is also connected to a random access memory (RAM) 222 for storing various run-time variables and data arrays, among others. The RAM 222 is sufficient to store user application programs and data. In this instance, the RAM 222 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 221 for data back-up purposes.

The computer system 200 has built-in applications stored in the ROM 221 or downloadable to the RAM 222 which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. Additionally, project planning tools, and CAD/CAM systems, Internet browsers, among others, may be added to increase the functionality of portable computing appliances. Users benefit from this software, as the software allows users to be more productive when they travel as well as when they are in their offices.

The computer system 200 receives instructions from the user via one or more switches such as push-button switches in a keypad 224. The processor 220 is also connected to a real-time clock/timer 225 that tracks time. The clock/timer 225 can be a dedicated integrated circuit for tracking the real-time clock data, or alternatively, the clock/timer 225 can be a software clock where time is tracked based on the clock signal clocking the processor 220. In the event that the clock/timer 225 is software-based, it is preferred that the software clock/timer be interrupt driven to minimize the CPU loading. However, even an interrupt-driven software clock/timer 225 requires certain CPU overhead in tracking time. Thus, the real-time clock/timer integrated circuit 225 is preferable where high processing performance is needed.

The processor 220 drives an internal bus 226. Through the bus 226, the computer system can access data from the ROM 221 or RAM 222, or can acquire I/O information such as visual information via a charged coupled device (CCD) 228. The CCD unit 228 is further connected to a lens assembly (not shown) for receiving and focusing light beams to the CCD for digitization. Images scanned via the CCD unit 228 can be compressed and transmitted via a suitable network such as the Internet, through Bhietooth channel, cellular telephone channels or via facsimile to a remote site.

Additionally, the processor 220 is connected to the multi-mode wireless communicator device 100, which is connected to an antenna 232. The device 100 satisfies the need to access electronic mail, paging, mode/facsimile, remote access to home computers and the Internet. The antenna 232 can be a loop antenna using flat-strip conductors such as printed circuit board wiring traces as flat strip conductors have lower skin effect loss in the rectangular conductor than that of antennas with round-wire conductors. One simple form of wireless communication device 100 is a wireless link to a cellular telephone where the user simply accesses a cellular channel similar to the making of a regular voice call. Also mention that one channel is reserved for making voice calls. Typically, data channels are not usable for voice communications because of the latency and low packet reliability, so a dedicated voice channel is necessary. In one implementation, GPRS, there are a total of 8 channels per user, one of which is dedicated to voice when the user decides to make a voice call. This voice connection is independent of the data connection.

The processor 220 of the preferred embodiment accepts handwritings as an input medium from the user, A digitizer 234, a pen 233, and a display LCD panel 235 are provided to capture the handwriting. Preferably, the digitizer 234 has a character input region and a numeral input region that are adapted to capture the user's handwritings on words and numbers, respectively. The LCD panel 235 has a viewing screen exposed along one of the planar sides of the enclosure are provided. The assembly combination of the digitizer 234, the pen 233 and the LCD panel 235 serves as an input/output device. When operating as an output device, the screen 235 displays computer-generated images developed by the CPU 220. The LCD panel 235 also provides visual feedback to the user when one or more application software execute. When operating as an input device, the digitizer 234 senses the position of the tip of the stylus or pen 233 on the viewing screen 235 and provides this information to the computer's processor 220. In addition to the vector information, the present invention contemplates that display assemblies capable of sensing the pressure of the stylus on the screen can be used to provide further information to the CPU 220.

The CPU 220 accepts pen strokes from the user using the stylus or pen 233 that is positioned over the digitizer 234. As the user "writes," the position of the pen 233 is sensed by the digitizer 234 via an electromagnetic field as the user writes information to the computer system. The digitizer 234 converts the position information to graphic data. For example, graphical images can be input into the pen-based computer by merely moving the stylus over the surface of the screen. As the CPU 220 senses the position and movement of the stylus, it generates a corresponding image on the screen to create the illusion that the pen or stylus is drawing the image directly upon the screens The data on the position and movement of the stylus is also provided to handwriting recognition software, which is stored in the ROM 221 and/or the RAM 222. The handwriting recognizer suitably converts the written instructions from the user into text data suitable for saving time and expense information. The process of converting the pen strokes into equivalent characters and/or drawing vectors using the handwriting recognizer is described below.

The computer system is also connected to one or more input/output (I/O) ports 242 which allow the CPU 220 to communicate with other computers. Each of the I/O ports 242 may be a parallel port, a serial port, a universal serial bus (USB) port, a Firewire port, or alternatively a proprietary port to enable the computer system to dock with the host computer. In the event that the I/O port 242 is housed in a docking port, after docking, the I/O ports 242 and software located on a host computer (not shown) support an automatic synchronization of data between the computer system and the host computer. During operation, the synchronization software runs in the background mode on the host computer and listens for a synchronization request or command from the computer system 200 of the present invention. Changes made on the computer system and the host computer will be itfiected on both systems after synchronization. Preferably, the synchronization software only synchronizes the portions of the files that have been modified to reduce the updating times. The I/O port 242 is preferably a high speed serial port such as an RS-232 port, a Universal Serial Bus, or a Fibre Channel for cost reasons, but can also be a parallel port for higher data transfer rate.

One or more portable computers 200 can be dispersed in nearby cell regions and communicate with a cellular mobile support station (MSS) as well as a Bluetooth station. The cellular and Bluetooth stations relay the messages via stations positioned on a global basis to ensure that the user is connected to the network, regardless of his or her reference to home. The stations are eventually connected to the Internet, which is a super-network, or a network of networks, interconnecting a number of computers together using predefined protocols to tell the computers how to locate and exchange data with one another. The primary elements of the Internet are host computers that are linked by a backbone telecommunications network and communicate using one or more protocols. The most fundamental of Internet protocols is called Transmission Control Protocol/Internet Protocol (TCP/IP), which is essentially an envelope where data resides.

The Web is based on a client/server model where Web pages reside on host computers that "serve up" pages when the user's computer (client computer) requests them. As the user "surfs" the Web, a browser can request data from the database on a server computer that processes and replies the desired data back to the computer system of FIG. 2 and to display that request when the request is fulfilled by the server. The client computer runs a browser software which asks for specific information by sending a HTTP request across the Internet 150 connection to the host computer. When the host computer receives the HTTP request, it responds by sending the data back to the client.

The browser commonly features a graphical user interface with icons and menus across the top along with a field to supply the URL for retrieval purposes. Navigational buttons guide the users through cyberspace in a linear manner, either one page forward or backward at a time. Pull down menus provide a history of sites accessed so that the user can revisit previous pages. A stop button is typically provided to cancel the loading of a page. To preserve favorite sites, a bookmark is provided to hold the user's favorite URLs in a list such as a directory tree. Furthermore, the browser typically provides a temporary cache on the data storage device or in RAM. The cache allows a more efficient Internet access as it saves bandwidth and improves access performance significantly. The browser also interprets HyperText Markup Language (HTML) which allows web site creators to specify a display format accessible by HTML compatible browsers.

Typically, when the user types in the URL or clicks on a hyperlink, TCP/IP opens a connection between the host and client computers. The browser then generates a request header to ask for a specific HTML document. The server responds by sending the HTML document as text to the client via the TCP/IP pipeline. The client computer acknowledges receipt of the page and the connection is closed. The HTML document is stored in the browser's cache. The browser then parses the HTML document for text and tags. If the browser runs across tags that link to images/pictures and sounds, the browser makes separate requests for these files to the server and displays or generates sounds to the user.

To supply more intelligent processing of information over the Internet, a language such as Java may be utilized. Java was developed originally by Sun Microsystems of Mountain View, Calif. The specification for the Java language is stored at the Java web site http://java.sun.com/. The web site contains the Java development software, a HotJava web browser, and on-line documentation for all aspects of the Java language, hereby incorporated by reference. Designed to be small, simple and portable across processor platforms and operating systems, Java can download and play applets on a browser system of the receiver, or reader. Applets are Java programs that are downloaded over the Internet World Wide Web, as dictated by a tag such as <applet> tags and executed by a Web browser on the reader's machine In Java, the compiler takes the instructions and generates bytecodes, which are system independent machine codes A bytecode interpreter executes the bytecodes. The bytecode interpreter can execute stand-alone, or in the case of applets, the bytecode interpreter is built-in Java compatible browsers. Thus, with a Java compatible client-server, the Internet is transformed from a passive giant book of information into an active network capable of supporting electronic commerce and virtual ecosystems. The computer 200 allows users to move about freely within and between cells while transparently maintaining all connections, particularly with the Internet.

The system enables easy synchronization and mobility during a cordless connection regardless of distance. The system opens up possibilities for establishing quick, temporary (ad-hoc) connections with colleagues, friends, or office networks. Appliances using the device 100 are easy to use since they can be set to automatically find and contact each other when within range. For example, a user is in his or her office and browses a web site on a portable computer through a wired local area network cable such as an Ethernet cable. Then the user walks to a nearby cubicle. As the user disconnects, the device 100 initiates a short-range connection using a Bluetooth.™. connection. When the user drives from his or her office to an off-site meeting, the Bluetooth.™. connection is replaced with cellular telephone connection. Further, when the multi-mode wireless communicator device 100 is in the cellular telephone connection mode, the short-range wireless transceiver core 130 is powered down to save power. Unused sections of the chip are also powered down to save power.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A portable computer system, comprising:
   a processor;
   a multi-mode wireless device on a single substrate coupled to the processor, the device comprising:
      an analog portion integrated on the substrate, including:
         a cellular radio core having an analog to digital converter (ADC) configured to receive a radio signal from an antenna, and
         a short-range wireless transceiver core; and
      a digital portion integrated on the substrate, including:
         a reconfigurable logic core coupled to receive converted data from the ADC, the reconfigurable logic core configured to handle a plurality of wireless communication protocols;
         a plurality of general-purpose processor cores coupled to the reconfigurable logic core;
         a router coupled to the reconfigurable logic core, the cellular radio core, and the short-range wireless transceiver core to de-correlate data into parallel streams that are not time-correlated and to route packets of data via a first wireless transmission medium and a second wireless transmission medium; and
         a memory array coupled to the reconfigurable logic core.

2. The portable computer system of claim 1, wherein the reconfigurable logic core includes one or more digital signal processors (DSPs).

3. The portable computer system of claim 1, wherein the reconfigurable logic core includes one or more reduced instruction set computer (RISC) processors.

4. The portable computer of claim 1, further comprising an input recognizer embodied in a program storage device, said input recognizer configured to receive input from a user.

5. The portable computer of claim 1, wherein the reconfigurable logic core comprises a vector processor.

6. The portable computer of claim 5, wherein the vector processor is configured to provide a parallel data output to the plurality of general-purpose processor cores.

7. The portable computer of claim 1, wherein the digital portion comprises a reconfigurable processor core including the reconfigurable logic core and the plurality of general-purpose processor cores.

* * * * *